United States Patent [19]

Hirase et al.

[11] Patent Number: 4,792,918

[45] Date of Patent: Dec. 20, 1988

[54] PROGRAMMABLE CONTROLLER MONITORING SYSTEM FOR SIMULTANEOUS MULTIPLE LINE DISPLAY OF ORIGINAL AND UPDATED DATA PROGRAM EXECUTION

[75] Inventors: Kiyoto Hirase, Nagaokakyo; Tetsuo Doi, Kyoto, both of Japan

[73] Assignee: Omron Tateisi Electronics Co., Japan

[21] Appl. No.: 147,653

[22] Filed: Jan. 25, 1988

Related U.S. Application Data

[63] Continuation of Ser. No. 912,649, Sep. 29, 1986, abandoned, which is a continuation of Ser. No. 497,195, May 23, 1983, abandoned.

[30] Foreign Application Priority Data

May 26, 1982 [JP] Japan ................................. 57-89427

[51] Int. Cl.⁴ ....................... G06F 15/46; G06F 3/14; G05B 19/10
[52] U.S. Cl. .................................. 364/900; 364/146; 340/756; 340/760; 371/29
[58] Field of Search ............... 364/140, 144, 146, 147, 364/200 MS File, 900 MS File; 371/29, 19, 20; 340/721, 734, 798, 756, 760

[56] References Cited

U.S. PATENT DOCUMENTS

| | | | |
|---|---|---|---|
| 3,505,665 | 4/1970 | Lasoff et al. | 340/724 |
| 3,944,984 | 3/1976 | Morley et al. | 364/900 |
| 4,070,702 | 1/1978 | Grants et al. | 364/900 |
| 4,189,765 | 2/1980 | Kotalik et al. | 364/900 |
| 4,279,012 | 7/1981 | Beckedorff et al. | 364/146 |
| 4,371,922 | 2/1983 | Fujita et al. | 364/144 |
| 4,381,505 | 4/1983 | Dion | 340/756 |
| 4,381,563 | 4/1983 | Groom, Jr. et al. | 371/20 X |
| 4,404,625 | 9/1983 | Saito et al. | 364/146 |
| 4,425,630 | 1/1984 | Yomogida et al. | 364/900 |
| 4,425,643 | 1/1984 | Chapman et al. | 371/20 |
| 4,429,368 | 1/1984 | Kroii | 371/19 X |
| 4,484,302 | 11/1984 | Cason et al. | 364/900 |
| 4,504,900 | 3/1985 | Yomogida et al. | 364/140 |

FOREIGN PATENT DOCUMENTS 2014765 8/1979 United Kingdom ................ 364/900

Primary Examiner—Raulfe B. Zache
Assistant Examiner—Thomas C. Lee
Attorney, Agent, or Firm—Wegner & Bretschneider

[57] ABSTRACT

Not any special display is required to provide a monitor displaying of I/O data and timer/counter data during operation of programmable controller. Instead, the display of program console will be utilized to display instruction codes and addresses or error messages in characters. Multiple number of sets, in which the numbers of either I/O data or timer/counter data which optionally specified with numbers, are displayed simultaneously on the character display of the program console.

2 Claims, 3 Drawing Sheets

PROGRAMMABLE CONTROLLER MONITORING SYSTEM FOR SIMULTANEOUS MULTIPLE LINE DISPLAY OF ORIGINAL AND UPDATED DATA PROGRAM EXECUTION

This application is a continuation of Ser. No. 912,649, filed Sept. 29, 1986, now abandoned, which is a continuation of Ser. No. 497,195, filed May 23, 1983, now abandoned.

BACKGROUND OF THE INVENTION

This invention relates to a programmable controller, specially to the monitor display system of input/output data and timer/counter data.

As it is widely known, in many general programmable controller, an input/output (I/O) status display having display lamps to correspond with each of terminals, is provided on the terminal board of I/O circuit to joint external I/O devices, where in actual use it is so arranged that the logical state of any I/O signal which is to be input to or output from each of the terminals will be displayed by flashing of a display lamp which corresponds to the terminal. Thus, the user can visually confirm on the display the status of the ever-changing I/O signal while the programmable controller is in the operating condition.

But, it also includes a problem that, when I/O equipment is to provide the above I/O status display, it will mean an increase of the total costs. In addition, it is seen relatively often in the actual use of programmable controllers, that the above I/O equipment is built into the control panel of the device, making the above I/O status display, and thus the I/O status, difficult to see.

BRIEF SUMMARY OF THE INVENTION

The purpose of this invention, which has been made to provide a solution to the prescribed problem, is not to provide a separate display for displaying the I/O status, but it is to preset a monitor display system of the programmable controller in which multiple sets of the numbers of either I/O data or timer/counter data and the contents of these data can be displayed simultaneously by optionally specifying them, by means of the display of the programmable controller, on which command codes, addresses or error messages are to be displayed in characters.

Other and further objects of this invention will become obvious upon understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
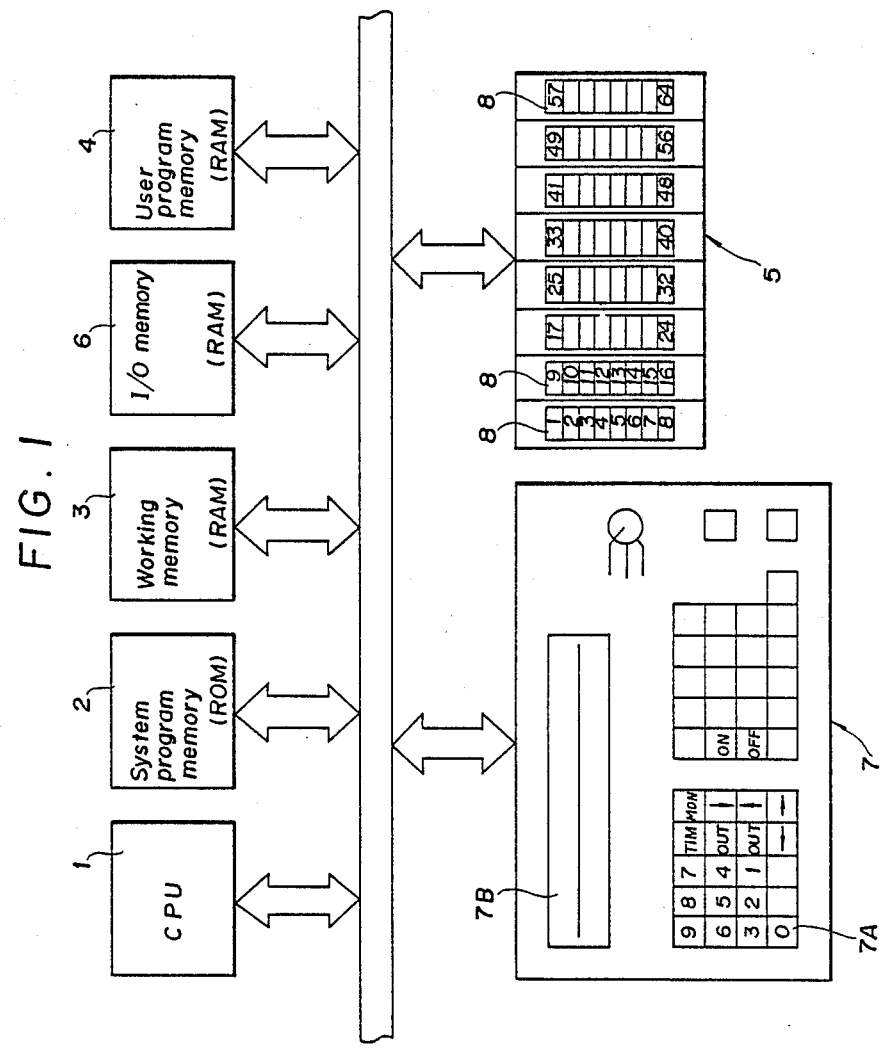
FIG. 1, a block chart, shows the general configuration of programmable controller in conjunction with this invention.

FIG. 1 is a block chart in which the general configuration of the overall programmable controller using this invention is given.

This programmable controller provides CPU 1 (Central Processing Unit) which is a control center, system program memory 2 in which a system program to be executed by CPU 1 is stored, working memory 3 which is used by CPU 1 as a temporaly stock area for various variable data, user program memory 4 in which a sequence control program to be set optionally by the user is stored, I/O equipment 5 (general name of both input and output equipments) in which an input interface to receive external input signals and an output interface to output external output signals are contained, I/O memory 6 which is used as a buffer memory of I/O data corresponding to I/O equipment 5, and program console 7 which is to be used in giving CPU 1 various action commands, in receiving the creation input and monitor instruction of the user program, or in displaying the input and monitoring display.

For a relatively small size programmable controller, CPU 1, system program memory 2, working memory 3 and I/O memory 6 out of those described above are all contained in a so called one-chip microcomputer.

As is well known, the execution behavior of a user program in a programmable controller of this type, is to read out user instructions in turn from user program memory 4, to perform computing between I/O data stored in I/O memory 6, and to update I/O data to be specified by the results of computing. Simultaneously with execution of this user program, input data to be given to I/O equipment 5 is written in the specified area of I/O memory 6 (input updating), output data in the specified area of I/O memory 6 is transmitted to I/O equipment 5 (output updating), and by this, the sequence status specified by the user program will be created, based on the relations between external input signals given to I/O equipment 5 and external output signals produced by the same equipment. It is also well known that objectives of computing by the user program are not only I/O data of I/O equipment 5, but data to be stored in working memory 3 or I/O memory 6, so called internal relays or auxiliary relays, is also included. In the same way, numeric data such as timer instructions and counter instructions can be also operated, using either working memory 3 or I/O memory 6.

I/O equipment 5 is separated into two units, and input unit and an output unit, and each of these units provides eight input or output terminals, respectively. The denotations "8" in FIG. 1 indicate the terminal boards of each unit of I/O equipment 5. Figures attached to terminals "8" denote the numbers of inputs and outputs. Namely, in this application, I/O equipment 5 consists of eight I/O units, in which $8 \times 8 = 64$ I/O signals in total are available and I/O Nos. 1 to 64 are assigned to each of these I/O signals (viz. I/O terminals).

Program console 7 provides a key board 7A, which contains ten keys, code keys and other function keys, and display 7B which displays instruction codes, addresses or error message in characters.

Figure 2:
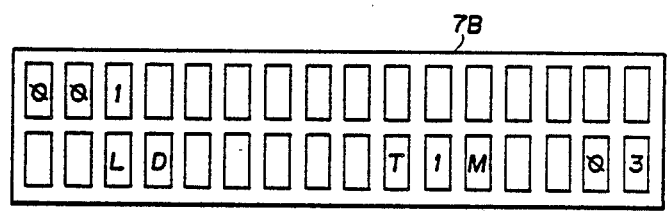
FIG. 2 is a dot matrix display panel of program console.

Display 7B is made up of a display panel of dot matrix type, as shown in FIG. 2. This panel is a liquid crystal panel in which 16 characters $\times 2$ lines $= 32$ characters in total can be displayed, with signal character area which is composed of dot matrix of 7 lines $\times 5$ columns.

As is known, input operation by which any user instructions are written to user program memory 4 is conducted by program console 7. At this time, the instruction code of an user instruction such as LD, AND, OR, NOT, OUT, TIM, CNT, etc which is being input is displayed alphabetically on display panel 7B. The address to which the instruction is to be stored, and the I/O No. which is to be dealt with the instruction (to be set as the operand of the instruction), are also displayed on the display panel. The example given in FIG. 2 (A) shows a display on display panel 7B, with which that a LD instruction for TIM contact No. 3 is to be set at program address 001 is indicated. Also, a monitor function of user instructions, with which any user instruction set in user program memory 4 can be read out and displayed, is usually provided, and the monitor display is also available on display panel 7B in the same way.

In the monitor display system of this invention, any four data of the status of 64 I/O signals of I/O equipment 5, internal and auxiliary relays, or numeric data to timer/counter instructions, are displayed on dot matrix display panel 7B while a user program is being executed, by linking them to the numbers of either I/O or timer/counter.

Figure 3:
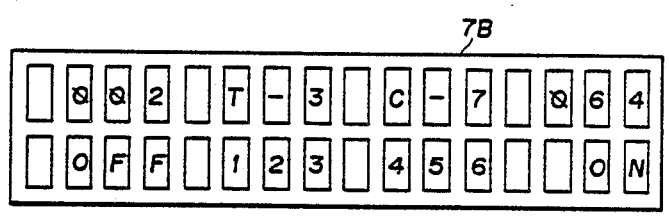
FIG. 3 is an explanatory drawing showing the case in which the I/O status is displayed on the above dot matrix display panel using the monitor display system introduced by this invention.

An example describing above is shown in FIG. 3, where a dot matrix composing of 16 characters×2 lines is divided in 4 partitions of 4 characters×2 lines, and the upper 4 characters of each partition are to display the number of I/O and timer/counter, and the lower 4 characters to display data corresponding to each of the numbers. In FIG. 3, four sets of monitor data that the data of I/O No. 2 is OFF, the present data value of timer No. 3 is 123, the present data value of counter No. 7 is 456, and the data of I/O No. 64 is ON, are displayed.

In order to obtain a display as above, data corresponding to each of the numbers is read every time a user program is executed, and control is to be done so as to display obtained data on the specified places, respectively.

Figure 4:
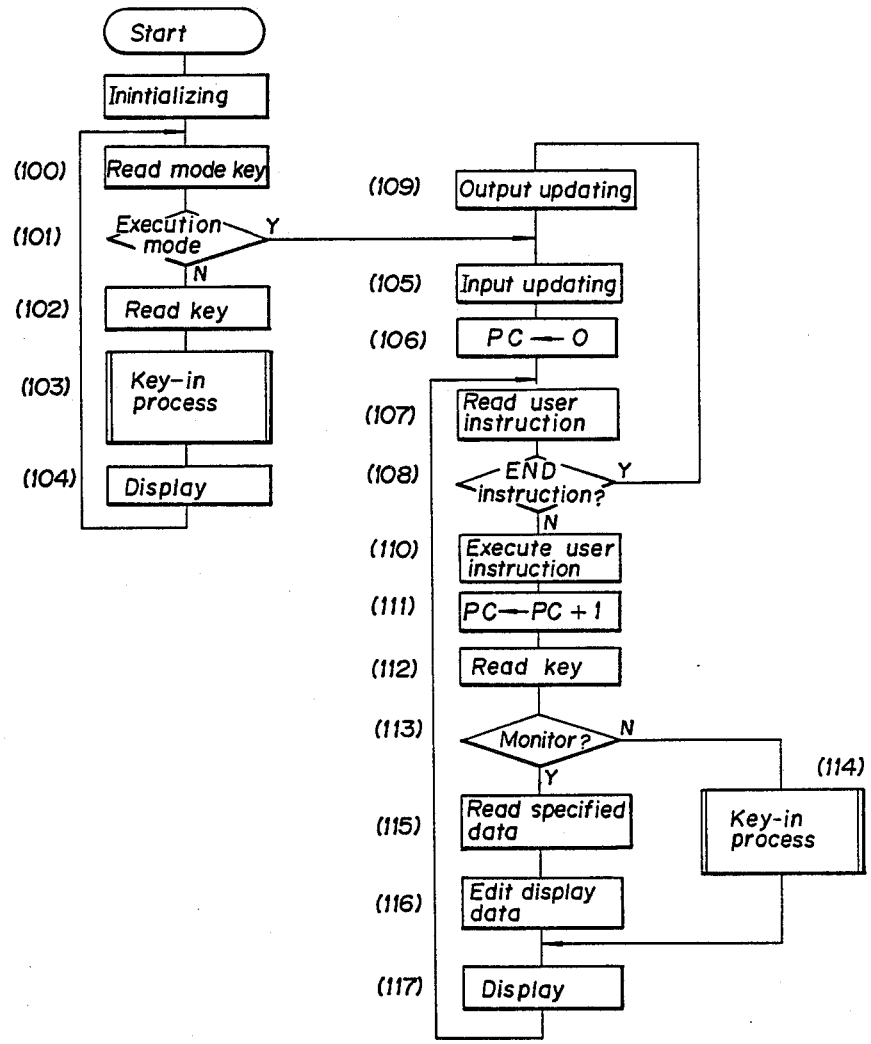
FIG. 4 is a flow chart showing the general configuration of the system program which controls the monitoring display by this invention.

FIG. 4 is a flow chart which outlines the system program to be executed by CPU 1. In step 100, which comes first after initializing, the status of mode key is read on program console 7, and in the case it is set to the program execution mode, the step goes to 101 toward 105. In case of the program creation mode, the step goes from 101 to 102 and reads the input on key board 7A, conducts a suitable process according to the key input in the step 103 (viz., produces a display data according to the key input), then in the step 104, charcters which correspond to the key input will be displayed on dot matrix display panel 7B, as shown in FIG. 2.

In case of program execution mode, input updating is done in step 105 first, the program counter (PC) is cleared in step 106, and in step 107, a user instruction is read which is to be addressed by the PC, from user program memory 4. Should the user instruction be not an END instruction which is to be inserted at the end of the user program, the step goes to 108 toward 110 and executes the instruction. In the next step 111, the PC is inched, and in step 112, the key input is read on key board 7A. In the step 113 evidence of key input is judged, by means of the multiple point monitor instruction introduced by this invention. Should there not be a multiple monitor instruction, the step goes to 114 and other key input process (the numbers of I/O and timer/counter to be input and monitored prior to the input of multiple point instruction are accepted through this process), then the display process is executed in the step 117, and returning to step 107, subsequent user instruction is read and executed. After repeating above processes, one cycle of the user program execution will complete with the END instruction to be detected in the step 108, and in this case, the step goes to 109 and output updating will be proceeded. Thereafter, the step goes to 105 for input updating, and through clearing of the PC in step 106, the execution process of the user program is conducted again.

While the above user program is executed, the numbers of the I/O or timer/counter to be monitored are input to four partitions by operating the keys on key board 7A, and after that, the multiple monitor instruction is input. Then input of the numbers to be monitored is stored in step 114. The input is detected in step 113 when the monitor instruction is input again, and step goes to 115. In the step 115, either the I/O data or the timer/counter data corresponding to the numbers to be monitored, which were keyed in the stored before, are read out from I/O memory 6, and these numbers to be monitored and the corresponding data are edited in pairs to display data, and in step 117, this data will be displayed on dot matrix display panel 7B. As a result, the prescribed monitoring display in which four sets of pairs of either I/O numbers or timer/counter numbers and the data corresponding to them are displayed in characters. Also, the display process routine 117 is finished and the step goes to 107, viz. the user instruction read routine, where the user program will be executed. Therefore, while the multiple point monitor instruction is given, I/O data or timer/counter data which changes every second due to the user program being executed is displayed on display panel 7B, and thus various operations can be checked through this display.

In addition, display panel 7B in the above embodiment is a dot matrix liquid crystal display to be composed of 33 characters in which these characters are divided in four partitions to provide a four point simultaneous monitor, but this invention is not limited to this and the simultaneous monitoring can be extended in proportion to the size of display panel.

Furthermore, it is also possible to add the scroll function to the above simultaneous monitoring function. It is realized with the following formation. The embodiment described here can simultaneously display four sets of monitoring data on the display panel, as the same as the embodiment above. The numbers to be monitored can be to more than four, for an example, up to eight. Eight numbers set to be monitored are selected in turn four by four by the scroll control signals. Four numbers selected by the scroll control signals and the monitoring data to correspond to each of said four numbers are simultaneously displayed on the said display panel.

Moreover, it is not necessary to input the numbers to be monitored one by one, but the numbers displayed in partitions can be either increased or decreased in units of partitions, by means of the increment keys or decrement keys respectively. For the timer/counter instruction, the set data value as well as the present data value are also settable, in this case, both values can be identified by applying proper signs to them. Recently developed programmable controllers are capable of setting or resetting any I/O data forcibly by specifying them from the program console regardless of practical I/O data, and in displaying these forcibly operated data, special signs are attached for identification.

As described in detail, the use of the monitor display system of the programmable controller of this invention offers following advantages to the user:

Only necessary data, out of ever changing I/O status or timer/counter data during the time the user program is being executed, is displayed on the display by which instruction codes and addresses are to be displayed in characters, in the form of data combined with corresponding addresses, therefore, the I/O equipment does not require an I/O status display, and considerable costs savings is also possible. Even in the case that the I/O equipment is hidden in the control panel, operation can be checked on the program console, and thus the use of this system can provide far more convenience in use.

As many apparently widely different embodiments of the this invention may be made without departing from the spirit and scope thereof, it is to be understood that the invention is not limited to the specific embodiments thereof except as defined in the appended claims.

What is claimed is:

1. A scanning-type programmable controller, comprising:

user program creation means for creating a user program which cmprises a means for inputting, a means for reading and a means for storing steps of the user program;

I/O equipment means for storing input data and output data;

I/O memory buffer means for temporarily storing the input data and output data stored in the I/O equipment means;

means for updating the input data stored in the I/O memory buffer means from the input data stored in the I/O equipment means;

means connected to the user program creation means for sequentially performing each step of the user program on the basis of the updated input data stored in the I/O memory buffer means;

means for updating the output data stored in the I/O equipment means for the output data stored in the I/O memory buffer means, after each step of said user program has been performed; and a monitor display system which comprises: (a) a multiple-data, multiple-line monitor instruction key; (b) means for determining when the multiple-data, multiple line monitor instruction key is in the monitor mode; and (c) means for inputting a multiple number of I/O numbers, timer numbers or counter numbers to be monitored while said monitor instruction key is not in the monitor mode; (d) means for storing the numbers thus input; and (e) display means connected to the numbers stored means and the means for updating the input data and the means for updating the output data for simultaneously displaying the numbers stored in said means for storing in combination with the updated input data, updated output data, timer data, or counter data corresponding to the numbers stored in said means for storing when the monitor instruction key in the monitor mode, said display means simultaneously displaying said stored numbers in a selected combination of numbers at a multiple number of lines.

2. The scanning-type programmable controller as claimed in claim 1, wherein the display means comprises an upper line and a lower line, the numbers stored in the means for storing being displayed on the upper line, the updated input data, updated output data, timer data, or counter data being displayed in the lower line in alignment with the corresponding numbers displayed in the upper line.

* * * * *